United States Patent Office 3,639,341
Patented Feb. 1, 1972

3,639,341
LINEAR POLYURETHANE RESIN
Heinrich Krimm, Krefeld-Bochum, Hermann Schnell, Krefeld-Uerdingen, and Günther Lenz, Krefeld, Germany, assignors to Farbenfabriken Bayer Aktiengesellschaft, Leverkusen, Germany
No Drawing. Filed July 30, 1968, Ser. No. 748,634
Claims priority, application Germany, Aug. 3, 1967,
F 53,136
Int. Cl. C08g 22/26
U.S. Cl. 260—47 CZ
5 Claims

ABSTRACT OF THE DISCLOSURE

Linear high molecular weight polyurethanes are prepared by polycondensation of binuclear N-alkylsubstituted hydroxy amines in which the hydroxyl group and the amino groups are aromatically bound in form of their monocarbonic acid derivatives or with bifunctional carbonic acid derivatives if desired in the presence of a catalyst.

This invention relates to linear high molecular weight polyurethanes, which are prepared by polycondensation, and more particularly to linear high molecular weight polyurethanes based on binuclear N-alkylsubstituted hydroxy amines, in which the hydroxyl group and the amino group are aromatically bound.

The preparation of high molecular weight polyureurethanes by reacting diisocyanates with dihydroxyl compounds, i.e. polyaddition is known. These linear polyurethanes exhibit varying stabilities depending on the kind of bonds between the reactive groups and the rest of molecule. Thus, polyurethanes prepared from aliphatic diisocyanates and aliphatic dihydroxyl compounds are stable practically up to 250° C., those from aromatic diisocyanates and aliphatic dihydroxyl compounds up to 200° C., those from aliphatic diisocyanates and divalent phenols up to 180° C. and those polyurethanes prepared from aromatic diisocyanates and divalent phenols are only stable up to about 120° C. The values for the maximum tolerable temperature when the polyurethanes are continuously heated, are considerably lower than the above mentioned temperatures but follow the same kind of pattern.

The preparation of linear polyurethanes which will have a sufficiently high molecular weight for practical purposes, by reacting diisocyanates with hydroxyl compounds in the melt gives rise to considerable difficulties because the polymerisation reaction has to compete with the degradation reaction. The equilibrium between these reactions depends on the temperature, and at lower temperatures the melt viscosity which increases with increasing degree of polyaddition sets a limit to the length of the macromolecules which can be produced and hence to the optimum qualities of the polyurethanes.

The preparation of linear polyurethanes which will have a sufficiently high molecular weight by polyaddition in solution is often impossible because of the insolubility of the polyadducts which are formed.

The only linear polyurethanes which have the properties of synthetic resins, but only a limited thermal stability, which have up until now attained any industrial importance are those based on aliphatic diisocyanates and dihydric alcohols, i.e. those polyurethanes which contain the group —NH—CO—O—.

It is also known to prepare linear high molecular weight polyurethanes by condensation (see German patent specification 900,136 and U.S. patent specification 3,189,579). Again, however, only polyurethanes of relatively low thermal stability are obtained. The heat stability can be improved if the nitrogen is part of a heterocyclic ring system and therefore not aromatically linked (see U.S. patent specification 2,731,445).

It has now surprisingly been found that high molecular weight polyurethanes which have excellent heat stability and other valuable properties which are characteristic of synthetic resins, can be produced by condensing binuclear hydroxy-N-alkylamines which have an aromatically linked hydroxyl and amino group with bifunctional carbonic acid derivatives or by self-condensation of monocarbonic acid derivatives of these amines to form high molecular weight polyurethanes.

It is therefore an object of the invention to provide improved linear high molecular weight polyurethanes by polycondensation of binuclear N-alkylsubstituted hydroxy amines in which the hydroxyl group and the amino group are aromatically bound in form of their monocarbonic acid derivatives or with bifunctional carbonic acid derivatives if desired in the presence of catalysts.

Another object of the invention is to provide improved linear high molecular weight polyurethanes by polycondensation of aryl esters of binuclear hydroxyl-N-alkylcarbamic acid, preferably phenyl esters, if desired in the presence of alkaline catalysts.

A further object of this invention is to provide improved high molecular weight polyurethanes by polycondensation of the phenyl ester of 4-hydroxyl-diphenyl-2,2-propane-4'-N-methyl-carbamic acid, if desired in the presence of alkaline catalysts.

It is also an object of this invention to provide an improved process for the production of linear high molecular weight polyurethanes by polycondensation which comprises polycondensation of binuclear N-alkyl-substituted hydroxy amines in which the hydroxyl group and the amino group are aromatically bound in form of their monocarbonic acid derivatives or with bifunctional acid derivatives if desired in the presence of catalysts.

It is also an object of the present invention to provide a process for the production of linear high molecular weight polyurethanes in which aryl esters of binuclear hydroxyl - N - alkyl-carbamic acid, preferably the phenyl esters are polycondensed if desired in the presence of alkaline catalysts.

Any suitable binuclear hydroxy-N-alkylamines may be used according to the invention, for instance binuclear hydroxy-N-alkylamines of the formula

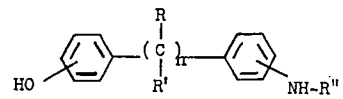

in which R and R' are equal or different and represent hydrogen or aliphatic radicals with 1 to 4 carbon atoms, such as methyl, ethyl, n- and isopropyl, n-, iso- and tert.-butyl radicals, R" represents aliphatic radicals with 1 to 6 carbon atoms, such as methyl, ethyl, propyl, butyl, hexyl radicals. $n$ is 0 or an integer from 1 to 6; binuclear hydroxy-N-alkyl-amines of the formula

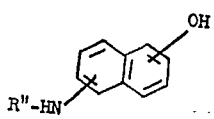

in which R″ has the already mentioned significance and binuclear hydroxy-N-alkyl-amines of the formula

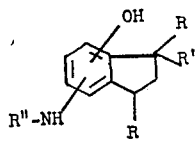

in which R, R′ and R″ have the significance as already mentioned. Suitable compounds of these types are 2- and 4-hydroxy-4′-methylamino-diphenyl;
2- and 4-ethylamino-naphthol-(1);
5-methylamino-naphthol-(1);
6-methylaminonaphthol-(2);
4-hydroxy-4′-methylaminodiphenylether;
4-hydroxy-4′-isopropylaminodiphenylsulphide;
6-hydroxy-4′-methylaminophenyl-1,3,3-trimethylindane;
4-hydroxy-4′-methylamino-diphenylmethane and
4-hydroxy-4′-isobutylamino-diphenylmethane.

The use of hydroxy-alkylamino-diphenylalkane derivatives of the formula

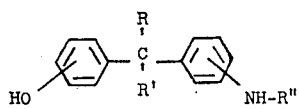

in which R, R′ and R″ have the definition as already mentioned, is preferred. Suitable compounds of this type are:

2,2-(4-hydroxy-4′-methylamino-diphenyl)-propane;
2,2-(4-hydroxy-4′-ethylamino-diphenyl)-propane;
2,2-(4-hydroxy-4′-isopropylamino-diphenyl)-propane;
2,2-(4-hydroxy-4′-methylamino-diphenyl)-butane;
2,2-(4-hydroxy-4′-methylamino-diphenyl)-pentane;
3,3-(4-hydroxy-4′-methylamino-diphenyl)-pentane and
1,1-(4-hydroxy-4′-methylamino-diphenyl)-cyclohexane.

Compounds of the latter group can be easily prepared according to German patent specification 1,217,971 by reacting the corresponding isoalkenylphenols with N-alkyl-anilines in the presence of acid catalysts.

Suitable bifunctional carbonic acid derivatives which may be used according to the invention are, for example, phosgene, dialkyl carbonates, such as diethylcarbonate or glycol carbonate and diarylcarbonates such as diphenyl carbonate or dinaphthylcarbonate. Diphenylcarbonate is preferably used.

Instead of reacting the hydroxylN-alkylamines with bifunctional carbonic acid derivatives, they may also be reacted with themselves when in the form of their monocarbonic acid esters. Monocarbonic acid derivativs of hydroxyl-N-alkyl-amines are, for example, their carbamic acid chlorides and carbamic acid alkyl or aryl esters, especially carbamic acid phenyl ester. These monocarbonic acid derivatives are prepared in known manner by reacting the hydroxyl-N-alkylamines with excess phosgene or with alkyl or aryl chloroformic acid esters in the presence of water binding agents, such as tertiary amines or alkali metal carbonate solutions, if desired in the presence of inert solvents.

The process according to the invention can be carried out in various ways. If the hydroxyl-N-alkylamines are, for example, reacted with phosgene the process may be carried out in inert solvents such as benzene, toluene, methylene chloride, carbon tetrachloride, chlorobenzene, chloroform, ethylene chloride, ethyl acetate, dioxane or tetrahydrofuran, either in homogeneous solution in the presence of tertiary amines such as triethylamine, dimethylcyclohexylamine, dimethylbenzylamine, dimethylaniline or pyridine, or in a two phase reaction medium in the presence of aqueous alkali metal hydroxide or carbonate solutions.

When reacting the hydroxyl-N-alkylamines with dialkyl or diaryl carbonates, the reaction is usually carried out in the presence of a small quantity of an alkaline or acid catalyst in the melt at 180 to 320° C. An example of a suitable alkaline catalyst is sodium phenolate, and of a suitable acid catalyst is zinc chloride.

If carbamic acid derivatives of the hydroxyl-N-alkyl-amines are used as starting materials, the preparation of the products of the process is very simple since the starting materials already contain the required functional groups in the correct proportion.

For example the carbamic acid chloride need only be treated with one equivalent of a tertiary amine or an aqueous alkali metal hydroxide solution in one of the above mentioned solvents at room temperature or at a slightly elevated temperature until a sufficiently high molecular weight has been reached.

One particularly simple method of carrying out the present process starts with the easily accessible carbamic acid aryl esters preferably the phenyl esters, of hydroxyl-N-alkylamines. 4-hydroxyl-diphenyl-2,2-propane-4′-N-methylcarbamic acid phenyl ester has proved to be particularly suitable for this purpose. The carbamic acid aryl esters are heated to the desired reaction temperature, e.g. with a small quantity of an alkaline catalyst at reduced pressure, and are then heated while the phenol is removed by distillation, and are finally heated under a high vacuum, until the desired metal viscosity (i.e. the desired degree of condensation) is reached.

Alkaline catalysts which may be used, if desired, are, for example, alkali metals, or the hydroxides, oxides, alcoholates, phenolates and alkylcarboxylates or arylcarboxylates of alkali metals or alkaline earth metals. The amount of these catalysts should generally be 0.0001–0.1% of the amount of carbamic acid ester used.

The reaction temperature, which also depends e.g. on the quantity of catalyst, is generally about 180 to 250° C. at the beginning of the reaction and should generally be increased towards the end of the polycondensation to 280 to 320° C.

The products of the process passes numerous valuable properties which make them suitable for a wide range of uses. Whilst those polyurethanes which have purely aromatic linkages, e.g. those prepared from aromatic diisocyanates and aromatic dihydroxyl compounds have the lowest temperature resistance when compared with other polyurethanes prepared from diisocyanates and diols, as mentioned above, the products of the process, which also have a purely aromatic urethane bond, in contrast show exceptionally high heat resistances which enables the products to be produced and worked up at temperatures far above 300° C.

In addition the products of the process exhibit good mechanical properties such as flexural strength, impact strength, notched impact strength and ball indentation hardness and a high modulus of elasticity. The high melting points ensure that the products can be used within a high temperature range. In addition, they have good electrical properties.

Another desirable and characteristic property of the products of the process is their resistance to hydrolytic agents such as aqueous alkali solutions, ammonia, or amine solutions. Even after several days boiling in dilute sodium hydroxide solution hardly any weight loss or deterioration in mechanical properties can be observed.

The products of the process show varying tendencies to crystallisation depending on their constitution. This property can be varied within wide limits by condensing a mixture of the various hydroxyalkyl amines given above.

The products of the process are synthetic resins which have especially valuable properties. They can be orientated by stretching and therefore suitable for the production of fibres and foils which are resistant to high temperatures. High temperature resistant films and coatings can also be produced from solutions of the resins in suitable solvents. They are also suitable for the production of sheet structures, mouldings and foam plastics.

These foams are useful as insulation in the walls of buildings, refrigerators, space crafts. Shaped articles of any type can be produced by thermoplastic processing of the products, e.g. using an extruder or injection moulding machine, in which high moulding temperatures may be employed.

Dyes, pigments and fillers and reinforcing elements, such as glass fibers, may also be incorporated with the products of the process.

EXAMPLE 1

A mixture of 24.1 g. of 2,2 - (4-hydroxy-4'-methylaminodiphenyl)propane and 21.4 g. of diphenylcarbonate is melted in a vacuum apparatus equipped with stirrer in an atmosphere of nitrogen, 0.2 mg. of the sodium salt of 2,2-(4-hydroxy-4' - methylaminodiphenyl)propane is added as catalyst and the melt is heated to a temperature of 150 to 250° C. Phenol starts to split off in this temperature range and the major portion of it is distilled off over one to two hours at a vacuum of 100 mm. Hg and at a temperature of 250° C. In order to remove the remaining phenol from the melt, which becomes highly viscous towards the end of the reaction, and in order to produce the desired degree of condensation, the temperature is gradually increased to 300 to 320° C. and the vacuum is increased in steps to 0.1 mm. Hg. Under these conditions, polycondensation is completed within 2 to 5 hours and a high molecular weight product which has a relative viscosity of 1.3 is obtained. When cold, the hard tough melt can be dissolved in solvents such as methylene chloride, ethylene chloride, trichloroethane or cyclohexanone. Films, foils, fibres or moulded products can be produced both from the solution and from the melt.

EXAMPLE 2

A mixture of 28.1 g. of 1,1 - (4-hydroxy - 4'-methylaminodiphenyl)cyclohexane and 21.4 g. of diphenylcarbonate is melted with 0.5 g. of sodium phenolate as a catalyst in a vacuum apparatus equipped with stirrer under an atmosphere of nitrogen and is heated to a temperature of 150 to 250° C. Phenol starts to split off in this temperature range and the major portion of it is distilled off over one to two hours at a vacuum of 100 mm. Hg and at a temperature of 250° C. In order to remove the remaining phenol from the melt, which becomes highly viscous towards the end of the reaction, and in order to obtain the desired degree of condensation, the temperature is increased to 300 to 320° C. and the vacuum is increased in steps to 0.1 mm. Hg. Under these conditions, polycondensation is completed within 2 to 5 hours and a high molecular weight product having a relative viscosity of 1.35 is obtained. When cold, the hard tough melt can be dissolved in solvents such as methylene chloride, ethylene chloride, trichloroethane or cyclohexanone. The product can be worked up into films, foils, fibres or moulded articles both from solution and from the melt.

EXAMPLE 3

40 g. of the phenyl ester of 4-hydroxy-diphenyl-2,2-propane-4'-N-methylcarbamic acid are heated to 150 to 250° C. in a vacuum apparatus equipped with stirrer under a nitrogen atmosphere with 0.15 mg. of sodium methylate as a catalyst. The phenol which is split off in this temperature range is distilled off over 1 to 2 hours at a vacuum of 100 mm. Hg; the reaction melt at the same time gradually becomes highly viscous. The remaining phenol is removed by gradually increasing the temperature to 300 to 320° C. and increasing the vacuum to 0.1 mm. Hg. Polycondensation is completed within 2 to 5 hours. The resulting hard tough material which has a relative viscosity of 1.6 can be worked up to give colourless clear films, foils, fibres or moulded articles from solution in methylene chloride, ethylene chloride, trichloroethane or cyclohexanone or from the melt. The thermal stability was tested on a film 50μ in thickness, using differential thermoanalysis, a melting point of 154° C. and thermal resistance of up to 370° C. being found. The resistance to hydrolytic agents was tested by boiling a sample of the product in 10% sodium hydroxide solution.

After 48 hours, the weight decrease was about 3.5% and the films remained unchanged in their external appearance, strength and elasticity. The modulus of elasticity was found to be 29,000 to 32,000. The ultimate tensile strength is 780 to 820 kg. wt./cm.$^2$. The material could be stretched to 2 to 2.5 times its original length, the ultimate tear resistance increasing to 1800 kg. wt./cm.$^2$.

EXAMPLE 4

40 g. of the phenyl ester of 4-hydroxy-diphenyl-2,2-propane-4'-n-ethylcarbamic acid are heated to 150 to 250° C. under an atmosphere of nitrogen in a vacuum apparatus equipped with stirrer, with 0.1 mg. of lithium as a catalyst. The phenol which is split off in this temperature range is distilled off over 1 to 2 hours and under a vacuum of 100 mm. Hg; the reaction melt gradually becomes highly viscous. By gradually increasing the temperature to 200 to 220° C. and the vacuum to 0.1 mm. Hg, the remaining phenol is removed and the polycondensation is completed within 2 to 5 hours. The resulting hard, viscous material which has a relative viscosity of 1.4 can be worked up into films, foils, fibres or moulded articles both from the melt and from solutions in methylene chloride, ethylene chloride, trichloroethane or cyclohexanone.

EXAMPLE 5

(a) Preparation of the starting material 86 g. of 35% Formalin solution (1 mol) and 188 g. (2 mol) of phenol which has been dissolved in a small quantity of water are added dropwise over one hour at 30° C. to a solution of 321 g. (3 mol) of N-methylaniline in 553 g. of 20% hydrochloric acid (3 mol). The reaction mixture is heated to the boiling point for 2 hours. When the reaction mixture is cold, it is diluted with an equal quantity of water, shaken with methylene chloride and the aqueous phase neutralised. The precipitated material is taken up in methylene chloride, dried over sodium sulphate, the solvent removed and the N-methylaniline is distilled off at 150° C./10 mm. Hg. The residue is dissolved in sodium hydroxide solution and methylene chloride, the aqueous phase separated, and the methylene chloride solution is again extracted with sodium hydroxide solution. The combined alkaline solutions are neutralised with 2 N hydrochloric acid, the neutral precipitate dissolved in methylene chloride and the solution dried and concentrated by evaporation. The residue is distilled under high vacuum. A fraction which distils at 150° C./0.08 mm. Hg is obtained, which is crystallised from toluene produced 12 g. of crystals, melting point 148–149° C. The compound which is soluble in dilute sodium hydroxide solution and in dilute hydrochloric acid solution, is 4-methylamino-4'-hydroxydiphenylmethane.

37.6 g. (0.24 mol) of phenylchlorocarbonate are slowly added dropwise with vigorous stirring over 1 hour at 25° C. to a solution of 50 g. (0.24 mol) of 4-methylamino-4'-hydroxydiphenylmethane in a mixture of 500 ml. of methylene chloride and a solution of 12.4 g. (0.12 mol)

of sodium carbonate in 120 ml. of water. The mixture is then allowed to react for another 1 to 2 hours and the aqueous phase is then separated. The organic phase is washed until neutral with water, dried and concentrated by evaporation. The residue is recrystallised from toluene. About 58 g. of the phenyl ester of 4-hydroxy-diphenyl-methane-4'-N-methylaminocarbamic acid of melting point 150 to 151° C. (after recrystallisation from toluene) are obtained.

(b) Process according to the invention 20 g. of the resulting phenyl carbamate together with 0.2 mg. of sodium phenolate as catalyst are heated to 150 to 250° C. in a vacuum apparatus equipped with a stirrer under an atmosphere of nitrogen. The phenol which is split off in this temperature range is distilled off over 1 to 2 hours under a vacuum of 100 mm. Hg; the reaction melt gradually becomes highly viscous. With increase of the temperature in steps to 300° C. and of the vacuum to 0.1 mm. Hg, the residue of phenol is removed and polycondensation is completed within 2 to 3 hours. The resulting hard tough material which has a relative viscosity of 1.3 (in methylene chloride solution) can be worked up into films, foils, fibres or moulded articles from the melt or from solution in methylene chloride, ethylene chloride or cyclohexanone.

EXAMPLE 6

(a) Preparation of the starting material

A melt of 134 g. (0.5 mol) of 1-(p-hydroxyphenyl)-6-hydroxy-1,3,3-trimethylindane and 195 g. (1.5 mol) of aniline hydrochloride is heated under a reduced pressure of nitrogen in such a way that the phenol distills off over a packed column 30 cm. high. 45 g. of phenol distills over into the receiver in the course of 7 hours at 100 mm. Hg and at a reaction temperature of 190 to 195° C. The reaction product is dissolved in water and neutralised with soda solution. After the addition of 200 ml. of methylene chloride, the crystals of 1-(p-aminophenyl)-6-hydroxy-1,3,3-trimethylindane are removed by suction filtration and are washed with methylene chloride. The yield is 90 g. which is 68% of the theoretical yield. Melting point (from methanol/water) 193–194° C.

50 g. of this aminophenol are heated at 100° C. for one hour with 40 g. of concentrated formic acid. The crystals go into solution and the N-formyl compound crystallises out within a short time. The yield is quantitative. Melting point (from methanol/water) 203–204° C.

30 g. of the N-formylaminophenol are added in portions to a suspension of 10 g. of lithium aluminium hydride in 200 ml. of absolute ether and the mixture is kept at boiling point for 3 hours. It is then poured on ice and stirred with 500 ml. of 2 N hydrochloric acid and the ether is removed by evaporation. The solution of the reaction products in hydrochloric acid is filtered and 1-(p-methylaminophenyl)-6-hydroxy - 1,3,3 - trimethylindane is precipitated by neutralising with sodium hydroxide solution which also precipitates aluminium hydroxide. Both precipitates are removed by suction filtration and are dried and the aluminium hydroxide is extracted with boiling methanol. 21 g. of methylaminophenol are obtained by evaporation of the methanolic solution. Melting point (from methanol/water) 160 to 161° C.

20 g. (0.07 mol) of methylaminophenol prepared as described above are suspended in a mixture of 300 ml. of methylene chloride and a solution of 3.8 g. (0.035 mol) of sodium carbonate in 40 ml. of water. After the addition of 0.1 g. of triethylamine as catalyst, 11.2 g. (0.07 mol) of phenyl chlorocarbonate are added dropwise within 30 minutes at a temperature of 25° C. with vigorous stirring. The reaction is left to continue for one to two hours at the same temperature and the aqueous phase is then removed. The organic phase is washed until neutral with water, dried and evaporated. The residue is distilled off under reduced pressure. About 22 g. of the phenyl ester of 1-(6-hydroxy-1,3,3-trimethylindane)-phenyl-4-N-methyl-carbamic acid of melting point 250° C./0.1 mm. Hg are obtained as a pale clear hard resin.

(b) Process according to the invention 20 g. of the resulting phenyl carbamate are polycondensed with itself as described in Example 5, phenol being split off. A tough elastic material which has a relatively viscosity of 1.4 and which can be worked up into films, foils, fibres or moulded products from the melt or from solution in methylene chloride, ethylene chloride and cyclohexanone is obtained.

Although the invention has been described in considerable detail for the purpose of illustration, it is to be understood that variations can be made by those skilled in the art without departing from the spirit of the invention and scope of the claims.

What is claimed is:

1. A linear high molecular weight polyurethane resin which is the reaction product of (A) phosgene, dialkyl carbonate or diaryl carbonate with (B) a member selected from the group consisting of

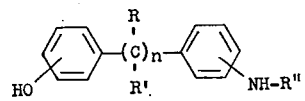

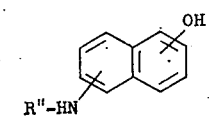

and

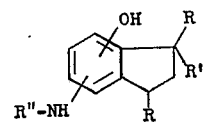

wherein R and R' are each hydrogen or alkyl containing 1 to 4 carbon atoms, R" is alkyl containing 1 to 6 carbon atoms and $n$ is zero or an integer from 1 to 6.

2. The polyurethane resin of claim 1 wherein (A) is diphenyl carbonate.

3. A linear high molecular weight polyurethane resin which is the polycondensation product of a monocarbonic acid derivative of a member selected from the group consisting of

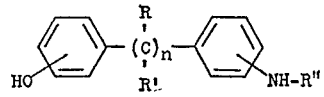

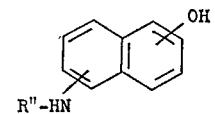

and

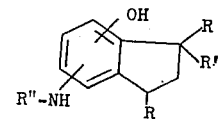

wherein R and R' are each hydrogen or alkyl containing 1 to 4 carbon atoms, R" is alkyl containing 1 to 6 carbon atoms and $n$ is zero or an integer from 1 to 6, said monocarbonic acid derivative being the reaction product of said selected member and phosgene, alkyl chloroformic acid ester or aryl chloroformic acid ester.

4. The linear high molecular weight polyurethane resin of claim 3 wherein said monocarbonic acid derivative is the reaction product of phenyl chloroformic acid ester and said selected member.

5. The linear high molecular weight polyurethane resin of claim 3 wherein said monocarbonic acid derivative is 4 - hydroxy-diphenyl-2,2-propane-4'-N-methylcarbamic acid phenyl ester.

References Cited

UNITED STATES PATENTS

| | | | |
|---|---|---|---|
| 3,189,579 | 6/1965 | Caldwell | 260—77.5 |
| 3,278,594 | 10/1966 | Sweeny | 260—544 |
| 3,296,201 | 1/1967 | Stephens | 260—47 |

WILLIAM H. SHORT, Primary Examiner

L. L. LEE, Assistant Examiner

U.S. Cl. X.R.

117—161 KP; 260—2.5 A, 32.8 N, 33.8 UB, 37 N, 77.5 B